Oct. 4, 1960     R. E. LIDDELL     2,954,872
FILTRATION OF LIQUIDS
Filed Sept. 4, 1956     2 Sheets-Sheet 1
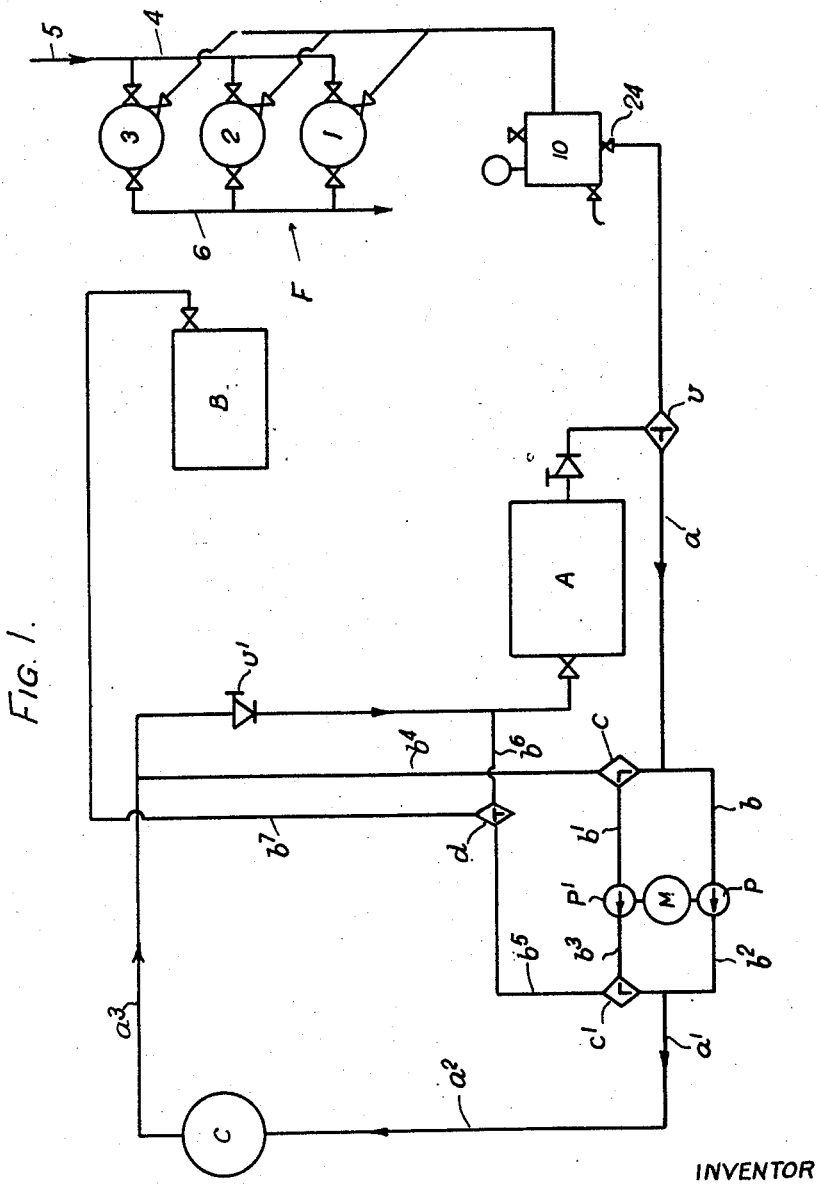
INVENTOR
ROBERT E. LIDDELL
BY
Watson, Cole, Grindle & Watson
ATTORNEYS

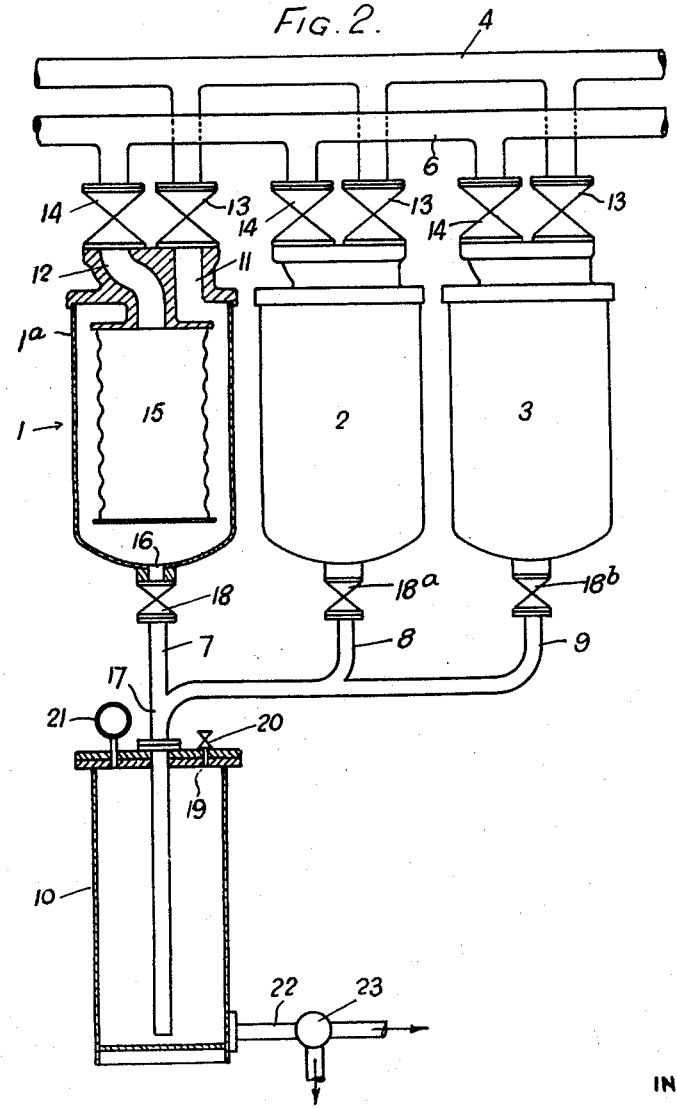

United States Patent Office 2,954,872
Patented Oct. 4, 1960

2,954,872

FILTRATION OF LIQUIDS

Robert Emond Liddell, Coatbridge, Scotland, assignor to Yarrow and Company Limited, Glasgow, Scotland Filed Sept. 4, 1956, Ser. No. 607,807

Claims priority, application Great Britain Sept. 8, 1955

4 Claims. (Cl. 210—82)

This invention relates to filtering means for liquids which includes two or more filter units having their inlets connected in parallel with a common main supply conduit for the liquid to be filtered and their outlets connected in parallel with a common delivery pipe through which the filtered liquid is taken off.

It is an object of the present invention to provide improved means for facilitating the removal of dirt, sludge, etc., from the filter elements of the units without the necessity of dismantling them.

According to the present invention conduit means is provided connecting the interior of each filter unit on the inlet side of the filter element located therein, with a drain tank which is maintained at a pressure less than that obtaining in the common outflow, said conduit being normally closed by a quick opening valve and the arrangement being such that by shutting off the supply of liquid to be filtered to a unit and opening the said valve, a rapid surge of liquid will be set up in reverse flow from the common outflow through the filter element and serve to dislodge any dirt or other foreign matter clogging the element, the said foreign matter being carried off by the reversely flowing oil through the conduit and discharged into the drain tank. After cleaning, the filter unit can be immediately brought into service again by closing the drain valve and reopening the supply from the common inflow to the unit.

It will be noted that liquid containing the foreign matter dislodged from the filter will not be returned to the inflow but will be contained in the drain tank whence it may be drawn off and purified, for example by a centrifugal separator, the purified liquid being thereafter returned to the system.

The drain tank may comprise a closed tank which is normally maintained at atmospheric pressure and provided with an air vent which is adapted to be closed during the cleaning of a filter element. The volume of the tank is preferably such that the entry into the tank of the quantity of reflux flow of oil it is necessary to displace through the filter element being cleaned in order to dislodge the foreign matter and clean the element, will compress the air in the tank to a pressure substantially corresponding with that obtaining in the common outflow so that due to the equalization of the pressures in the tank and common outflow, the flow of oil into the tank will automatically cease. At the end of the reflux flow necessary to clean the filter element, the compressed air remaining in the upper part of the tank will act as a cushion so that the surge of liquid will be brought to rest without undue shock.

To enable the invention to be fully understood it will now be described with reference to the accompanying drawings, in which:

Fig. 1 illustrates in diagrammatic form a filter and purification plant including filtering means according to one embodiment of the invention, and Fig. 2 is a side view partly in section of the filter unit per se.

As shown in the accompanying drawing the filter assembly generally indicated by F includes three filter units 1, 2, 3, the inlets of which are connected in parallel to a common inflow oil line 4 leading from a return-flow line 5 of a lubricating system for a machinery installation. The outlets of the units are connected in parallel to a common outflow oil line 6 adapted to be connected in the return-flow line of the system. The filter units are also respectively connected by conduits 7, 8, 9 with a drain tank 10.

The filter units 1, 2, 3 are of identical construction and as shown more particularly in Fig. 2 include a casing 1a, having an inlet 11 and an outlet 12 respectively connected with the common inflow and outflow lines 4, 6, inlet and outlet shut-off valves 13, 14 being provided for each unit.

A hollow cylindrical filter element 15 is located centrally in the casing 1a, the cylindrical wall of the element being spaced inwardly of the wall of the casing to permit the flow of liquid to be filtered round the element and after passing therethrough to flow through the outlet 12 into the common outflow 6.

Each unit is also provided with a drain opening 16 with which is connected a drain conduit 7, 8, 9, the respective conduits opening into a pipe 17 which extends in a fluid tight manner through the top of the drain tank 10. Valves 18, 18a, 18b are provided for controlling the flow of liquid from the filter units into the conduits 7, 8, 9, the valves being of the type that can be rapidly moved from fully closed to fully open position and vice versa.

The pipe 17 extends vertically downwardly into the tank 10, its lower end opening at or adjacent to the bottom of the tank. The upper wall of the tank is formed with an air vent 19, controlled by a valve 20. A pressure gauge 21 is also mounted on the upper wall of the said tank. A discharge pipe 22 opens into the tank 10 adjacent to its lower end, the pipe being connected in the flow line a of an oil separation or purification plant, as illustrated in Fig. 1.

The lubricating system with which the filter units are connected is such that the normal flow of oil can be dealt with efficiently by using only two of the filter units, the third serving as a reverse or stand-by to be brought into use when the other filters require cleaning.

Assuming that the filter units 1 and 2 are being used and that the unit 3 is the stand by, the inlet and outlet valves 13, 14 will be open in the case of the units 1 and 2 and closed in the case of the unit 3, the drain valve 18, 18a, 18b will, however, be closed to isolate the units from the drain tank 10 and the valve 23 would also be closed and the air vent 20 open to permit air to enter the tank which will accordingly be maintained at atmospheric pressure.

During the normal operation oil to be filtered will flow through the common inflow line 4 into the filter casing of the units through the inlets 11, pass through the filter elements 15 which in known manner serve to trap any dirt, sludge or other foreign matter entrained in the oil, the filtered oil then flowing through the outlets 12 to the common outflow line 6.

Should it be desired to clean a filter element, for example, the unit 1, the stand by unit is brought into use by opening its valves 13, 14. The cleaning of the filter 1 is then effected in a very simple manner by closing the inlet valve 13 and the air valve 20 of the drain tank and then opening the valve 18. As the outlets of the units are connected in parallel with the outflow line 6, oil will continue to flow into the outflow line from units 2, 3 which are in operation, and the oil will accordingly be flowing through the outflow line at a pressure which will be much higher than atmospheric pressure. In consequence, as the drain tank 10 is at atmospheric pressure, when the valve 18, which is a quick opening valve, is rapidly moved to fully open position, there will be a rapid reflux flow of oil from the outflow line 6 into the unit 1. This oil, which will be flowing in the reverse to normal direction, will pass outwardly through the wall of the filter element 15 and thence through the conduit 7, flow into the drain tank 10. This sudden surge of reflux oil will be sufficient to dislodge any dirt, sludge or any other foreign matter adhering to the element and carry it through the conduit 7 into the drain tank.

The volume of the drain tank is such that the quantity of reflux oil necessary to clean the filter unit will not completely fill the tank. As the air valve 20 is closed before the filter operation is started the air in the tank which is initially at atmospheric pressure will be trapped in the upper portion of the tank and be depressed by the inflowing liquid. When the tank is nearly filled with liquid the trapped air will be compressed by a pressure equal to that in the outflow line 6 and due to the equalization of pressure the reflux flow of oil will automatically cease. It will be noted that the trapped air will form a cushion so that the reflux flow of liquid will be arrested without undue shock. By providing a tank of suitable size the cleaning operation can be completed with a minimum "draw off" of the oil from the system.

After the cleaning operation the unit 1 can be brought into service again merely by closing the valve 18 and re-opening the inlet valve 13. An important advantage of the present invention is that the foreign matter dislodged from the clogged filter is not returned to the inflow line but is discharged into a separate drain tank and thereby withdrawn from the system.

At a suitable opportunity the oil in the drain tank 10 is delivered to a separation or purification plant by opening the discharge valve 23 and the air vent 20 when the outflow of oil has restored the pressure in the drain tank to atmospheric.

One suitable form of plant for purifying the oil collected in the tank 10 is illustrated in Fig. 1. As shown it includes a main oil collecting tank A, an auxiliary oil collecting tank B and a centrifugal separator C. The tank B is located at a higher level than the separator C or tank A. The centrifugal separator is connected by flow lines $a$, $a^1$, $a^2$, and $a^3$ with the tank A, and a pair of pumps P, $P^1$ is provided which, as shown, are driven by a common motor M. The pumps are arranged in parallel, their suction sides being connected with the flow line $a$ by branches $b$, $b^1$ and their discharge sides being connected with the flow line $a^1$ by branches $b^2$, $b^3$. It will be noted that multi-way valves $c$, $c^1$ are located in the branches $b^1$, $b^3$, the valves being adapted to be interconnected so as to be simultaneously adjustable.

A flow line $b^5$ is connected to the valve $c^1$ and a multi-way valve $d$ is provided to control the flow of oil to either tank A or B through the flow lines $b^6$, $b^7$. A flow line $b^4$ is connected between the valve $c$ and the flow line $a^3$ intermediate the separator C and the main tank A.

The pump P is designed to have a rated output such that it can pump oil to the separator C at a rate to permit the latter to operate at its rated throughput capacity, and the pump $P^1$ is designed to have a rated output at least equal to that of the pump P and preferably slightly greater. It is to be understood that the "rated throughput capacity" of a separator is determined by the quantity of liquid that can be passed once through in a given time to enable the separator to operate at its maximum efficiency in separating out contaminating matter from the liquid.

When the oil in the drain tank 10 is to be purified the valve 23 is opened and the valve V adjusted to a position to isolate the tank A from the flow line $a$ and permit the flow of oil from the tank 10 to the pumps.

As shown in Fig. 1 the valves $c$, $c^1$ are positioned to connect the pumps with the flow lines $a$, $a^1$ and accordingly when the motor M is operating both pumps will work in parallel and draw oil from the tank 10 and deliver it to the separator where entrained foreign matter will be separated out and the clean oil discharged into the flow line $a^3$ whence it flows into the collecting tank A.

As the output of each pump is at least equal to the rated throughput of the separator, it follows that when both pumps are working in parallel, the oil will be pumped to the separator at such a rate that the latter will operate at at least double its rated throughput, thereby rendering the drain tank available for use in the cleaning of another filter with the minimum of delay.

In certain circumstances it may be preferred to pass the oil through the separator at its rated throughput or it may be desired to deliver oil discharged from the separator to a higher level than the latter, for example, to the high level tank B or to points of use at such level. In either case valve $c$ is adjusted to connect the branch $b^1$ with the flow line $b^4$ instead of with the branch $a$, the valve $c^1$ is adjusted to connect the branch $b^3$ with the flow line $b^5$. The valve $d$ can then be adjusted to connect the flow line $b^5$ with either of the lines $b^6$ or $b^7$ so that the oil discharged from the separator will be returned to the main tank A or the high level tank B. The valve $v^1$ would of course be closed. In this arrangement the pump $p^1$ is isolated from the flow lines $a$, $a^1$ and accordingly when both pumps are operating, only the pump P will pump oil from the drain tank 10 to the separator so that the latter will now operate at its rated throughput capacity. The clean oil discharged from the separator will, however, flow through the lines $a^3$, $b^4$ to the suction side of the pump $P^1$ by which it will be pumped through the line $b^5$ and $b^6$ or $b^7$ to the main collecting tank A or to the high level storage tank B.

The tank B can be located at a much higher level than the separator as the pump $P^1$ will serve to boost the pressure of the oil so that it will flow to the desired high level in the system.

When it is not required to purify oil in the drain tank 10, the system can be used for recirculating oil in the tank A through the separator. In this case valve $v$ will be adjusted to a position where connection is established between the tank A and the flow line $a$ and the connection with the drain tank 10 is shut-off. Assuming that the valves $c$, $c^1$ are in the position shown in Fig. 1 and the valve $v^1$ open, oil will be circulated by the pumps working in parallel through the separator and back to the tank A, the oil being passed through the separator at a rate such that the latter will operate at double its normal throughput capacity. The rate of removal of contaminating matter from the oil, however, will be increased as in a given time twice the quantity of oil will be passed through the separator with only a relatively insignificant reduction in the efficiency of separation as compared with when one pump is supplying oil to the separator and the other is used for delivering the separated oil to one of the tanks.

It will be understood that the tank A may form the main drain or collecting tank of a lubricating system for a machinery installation, oil being adapted to be fed into the tank from the machinery components through conduits not shown, the tank B forming a second high level storage tank of the system. The purification plant illustrated in Fig. 1 will normally be used for purifying oil in the lubricating system but will also be used for purifying the oil in the drain tank 10 as and when required.

If desired a by-pass pipe (not shown) may be provided connecting the flow lines 5, 6 (Fig. 1), a full bore spring loaded on hand operated valve being located in the by-pass pipe so that in the event of the resistance to flow through the filters increasing beyond a predetermined value, the valve can be opened to allow unfiltered oil to flow from the line 5 to the line 6 in order to maintain the oil supply to the machinery components and at the same time provide adequate pressure in the flow line 6 for producing the necessary reflux flow to effect the cleaning of the filter elements.

I claim:

1. A method of cleaning a filter unit of a filter apparatus having a plurality of filter units each of which includes a chamber housing a filter element, the inlet side of each chamber being connected to a common inflow conduit and the outflow side of each chamber being connected to a common outflow conduit, the method comprising isolating the inlet side of the chamber of the unit to be cleaned from the common inflow conduit and connecting said inlet side to a closed drain tank containing air at a pressure less than the pressure in the common outflow conduit, directing a reflux flow of filtered liquid from the common outflow conduit through the filter element into said drain tank and alllowing said reflux flow to continue until it is automatically stopped by the air trapped in the drain tank being compressed by the inflowing liquid to a pressure substantially corresponding to that in said common outflow conduit.

2. A method of cleaning a filter unit of a filter apparatus having a plurality of filter units each of which includes a chamber housing a filter element, the inlet side of each chamber being connected to a common inflow conduit and the outflow side of each chamber being connected to a common outflow conduit, the method comprising isolating the inlet side of the chamber of the unit to be cleaned from the common inflow conduit and connecting said inlet side to a closed drain tank containing air at approximately atmospheric pressure, permitting a reflux flow of filtered liquid from the common outflow conduit through the filter element into said drain tank until the pressure of the air trapped in the said drain tank is compressed by the inflowing liquid to a pressure substantially corresponding to that in the said common outflow conduit.

3. A filtering apparatus for liquids comprising a series of filter chambers each housing a filtering element and having inlet and outflow connections, the inlet sides of the said chambers being connected with a common inflow conduit and the outlet sides of said chamber being connected with a common outflow conduit, a drain conduit connected with the inlet side of each chamber, a quick opening valve located in each drain conduit, means for temporarily stopping the flow of unfiltered liquid into the inlet of one of the said chambers to permit, on the opening of the quick opening valve in the drain conduit connected with said chamber, a rapid reflux flow of filtered liquid from the common outflow conduit through the chamber to clean the filtering element, and means for effecting a cessation of said reflux flow comprising a drain tank connected with the drain conduit and containing a predetermined amount of air at a pressure less than that in the common outflow conduit so that the reflux liquid flowing into the drain tank will raise the pressure of the air trapped in said tank to a pressure substantially equal to that in the said common outflow conduit.

4. In filtering apparatus for liquids comprising a series of filter chambers each housing a filter element, the inlet sides of the said chambers being connected with a common inflow conduit and the outlet sides of said chambers being connected with a common outflow conduit, normally closed drain conduit means connected with the inlet side of each chamber, means for temporarily stopping the flow of unfiltered liquid into the inlet of one of the said chambers, means for opening the drain conduit means of said chamber to permit a rapid reflux flow of filtered liquid from the common outflow conduit through the chamber to clean the filter element, and means for effecting a cessation of said reflux flow comprising a drain tank connected with the drain conduit means, said tank containing a predetermined amount of air at a pressure less than that in the common outflow conduit so that the reflux liquid flowing into the drain tank will raise the pressure of the air trapped in said tank to a pressure substantially equal to that in the said common outflow conduit.

References Cited in the file of this patent

UNITED STATES PATENTS

| | | |
|---|---|---|
| 582,432 | O'Neil et al. | May 11, 1897 |
| 2,079,475 | Williams et al. | May 4, 1937 |
| 2,271,814 | Coolidge | Feb. 3, 1942 |